United States Patent [19]

Iqbal et al.

[11] Patent Number: 4,821,765
[45] Date of Patent: Apr. 18, 1989

[54] VALVE FOR FAUCET OR THE LIKE

[75] Inventors: Muhammad Iqbal, Sheboygan; Dana F. Buccicone, Kohler, both of Wis.

[73] Assignee: Kohler Co., Kohler, Wis.

[21] Appl. No.: 205,284

[22] Filed: Jun. 10, 1988

[51] Int. Cl.$^4$ .............................................. F16K 3/02
[52] U.S. Cl. .................................. 137/270; 137/454.5; 137/625.31; 251/288
[58] Field of Search ................. 137/270, 454.2, 454.5, 137/454.6, 625.31; 251/286, 287, 288, 304, 363; 411/525, 526, 528, 521

[56] References Cited

U.S. PATENT DOCUMENTS

| | | |
|---|---|---|
| 880,127 | 2/1908 | Cramer . |
| 2,321,157 | 6/1943 | Rees ..................... 411/521 |
| 3,389,717 | 6/1968 | Povalsky et al. ........... 137/454.5 X |
| 3,425,660 | 2/1969 | Holycross, Jr. ............ 251/172 |
| 3,570,810 | 3/1971 | Kawolics ................... 251/172 |
| 3,780,758 | 12/1973 | DeVries ................... 137/454.6 |
| 3,807,455 | 4/1974 | Farrell ..................... 137/625.31 |
| 3,810,602 | 5/1974 | Parkinson ................. 251/304 |
| 3,831,621 | 8/1974 | Anthony et al. .......... 137/270 |
| 4,005,728 | 2/1977 | Thorp ...................... 137/270 |
| 4,314,581 | 2/1982 | Schrock .................... 137/454.5 |
| 4,331,176 | 5/1982 | Parkison ................... 137/454.5 |
| 4,575,881 | 3/1986 | Rozek ....................... 4/405 |
| 4,651,770 | 3/1987 | Denham et al. .......... 137/625.31 X |
| 4,700,736 | 10/1987 | Sheen ....................... 137/454.6 X |

FOREIGN PATENT DOCUMENTS

| | | |
|---|---|---|
| 957241 | 11/1974 | Canada . |
| 0003459 | 8/1979 | European Pat. Off. ....... 137/625.31 |
| 0088334 | 11/1985 | European Pat. Off. . |
| 3297895 | 12/1983 | Fed. Rep. of Germany . |
| 2487940 | 2/1982 | France ....................... 137/625.31 |
| 2093956 | 9/1982 | United Kingdom . |
| 2136544 | 6/1986 | United Kingdom . |

*Primary Examiner*—Gerald A. Michalsky
*Attorney, Agent, or Firm*—Quarles & Brady

[57] ABSTRACT

A removable cartridge type valve is provided which has a minimum number of parts yet affords right and left hand conversion for cold and hot water usage in the same valve. A cross shaped groove is provided on the top of the movable disk, and the stem selectively is inserted into one or the other arm of the groove. The valve also provides a secure fitment of the valve stem in the valve body through the use of a grooveless type retaining member. Further, any tendency for bottom gasket members to be forced down out of the valve housing is eliminated by the use of an L-shaped gasket. Binding is also reduced by thinning the gasket adjacent the intersection of the arms of the L on the gasket.

13 Claims, 3 Drawing Sheets

VALVE FOR FAUCET OR THE LIKE

BACKGROUND OF THE INVENTION

A. Field Of The Invention

This invention relates primarily to faucets which use replaceable valve cartridges. These cartridges usually have ceramic disks for sealing and are of the non-rise type. In faucets of this type, separate valve units are often used for the hot and cold water supply, with the outlets of each valve unit being connected to a common discharge spout.

B. Description Of The Art

"Non-rise" ceramic disk cartridge valve units are well known. See e.g. U.S. Pat. No. 4,651,770. As indicated in that patent, a problem common to valves of this type is the need for an inexpensive and easy means for converting the valve from clockwise (e.g., cold water) operation to counterclockwise (e.g., hot water) operation at the time of installation (so as to avoid the need for manufacturing and inventorying two different valves). The prior art has sought to solve this problem using a number of different approaches, none of which has both the simplicity and all the advantages of the present invention.

Another problem associated with valves of this type is that the spindle in some valves is not held in a precise and secure manner. This has been found to occur where a groove for a retaining clip is machined into the spindle. If the groove is not machined at a precise location, there can be undesired play (with increased wear on the ceramic parts). Other problems with valves of this type are the creation of turbulence in the water (with resulting noise and wear) as the water passes through the valve body, the fact that some valves of this type begin to require greater levels of torque to turn the valve spindle as the valve ages, and the fact that where reverse pressure occurs the bottom seal can sometimes be drawn out of the bottom of the valve body. Thus, it can be seen that a need exists for an improved valve of this type.

SUMMARY OF THE INVENTION

In one aspect, the invention provides a removable cartridge type valve for use in a faucet housing or the like, the housing having an inlet in its bottom and an outlet. The cartridge valve has a valve body with an axial bore and an open lower end for fluid communication with the inlet in the bottom of the housing. There is also at least one outlet in the valve body for fluid communication with the outlet in the housing.

A stationary valve element and a movable valve element both are positioned in the valve body for regulating fluid flow through the valve in response to rotation of the movable element over the stationary element. A rotatable spindle is sealed within an upper end of the axial bore of the valve body, the spindle having one end extending outside of the valve body, and the other end connected to a drive member. Also, a groove structure is formed on an upper side of the movable valve element, the groove structure being capable of receiving the drive member in two positions which are more than 10° but less than 170° rotationally disposed with respect to each other.

There is also a stop formed on the valve body to limit the rotation of the spindle. Contact between the drive member and the movable valve element in response to rotation of the spindle rotates the movable valve element over the stationary valve element. Changing the relative positions of the groove structure and drive member between the first and second receiving positions causes a conversion of the valve from a right hand valve to a left hand valve or vice versa. Preferably, the groove structure is in the form of a cross.

A ring-like grooveless type retaining member (e.g. a push nut) is positioned on the spindle outside the valve body to restrict downward movement of the spindle. The ring has on its inner periphery at least one tooth which projects upward at an angle relative to the plane of the outer portion of the ring.

In another preferred form, the stationary valve element is in the form of a disk and the disk has a bottom peripheral groove. A gasket is positioned so that one portion of it is held on the peripheral groove and another portion of it extends radially outward under the valve body.

In another aspect, the invention provides a fluid control valve with a body having an axial bore, an open lower inlet end, and an outlet. Also provided are a stationary valve element and a movable valve element, both being positioned in the valve body for regulating fluid flow through the valve in response to rotation of the movable element over the stationary element.

A rotatable spindle is sealed within an upper end of the axial bore of the valve body, the spindle having one end extending outside of the valve body and the other end connected to a drive member. A groove structure is formed on an upper side of the movable valve element, the groove structure being capable of receiving the drive member in two positions which are more than 10° but less than 170° rotationally disposed with respect to each other.

A stop is formed on the valve body to limit the rotation of the spindle. Contact between the drive member and the movable valve element in response to rotation of the spindle rotates the movable valve element over the stationary valve element. Changing the relative positions of the groove structure and drive member between the first and second receiving positions causes a conversion of the valve from a right hand valve to a left hand valve or vice versa.

In yet another aspect of the invention, there is provided a removable cartridge type valve for use in a faucet housing or the like. The housing has an inlet in the bottom of the housing and an outlet. The cartridge type valve has a valve body with an axial bore and an open lower end for fluid communication with the inlet in the bottom of the housing and at least one outlet in the valve body for fluid communication with the outlet in the housing.

There is also a stationary valve element and a movable valve element, both being positioned in the valve body for regulating fluid flow through the valve in response to rotation of the movable element over the stationary element. A rotatable spindle is sealed within an upper end of the axial bore of the valve body, the rotatable spindle having a shank portion extending outside the valve body. A drive member is connected to the lower end of the spindle.

Means are operatively associated with the drive member and the movable valve element to provide driving contact between the drive member and movable valve element. A ring-like retaining member (e.g. a push nut) is also operatively positioned on the shank portion of the rotatable spindle outside the valve body to retain the rotatable spindle in the valve body, the retaining member being ring-like and having on its inner periphery at least one tooth which projects upwardly at an angle relative to the plane of the outer portion of the ring. A stop is formed in the axial bore to limit rotation of the spindle, the stop also limits downward movement of the spindle in some, but not all, rotational positions of the spindle.

In yet another embodiment, there is also provided a ring gasket, the top portion of which is held between the stationary disk's peripheral groove and the valve body, and another portion of which extends radially outward under the valve body, said radial portion narrowing in thickness adjacent its intersection with the lateral portion.

It will be appreciated that the groove means permits easy right/left conversion on site, without the need for any additional parts. The retaining member/stop combination provides for secure retention and holds the stem in place during conversions. The seal at the bottom of the valve is better retained since it is sandwiched *both* between the bottom disk and the valve body, and between the valve body and housing. Further, the thinning of the radial portion reduces the tendency of the valve to bind over time. Flow is smoother due to contours on the disks.

The objects of the invention therefore include:
a. providing a valve of the above kind which is readily convertible to either right or left hand operation;
b. providing a valve of the above kind which can be manufactured with few parts and thus at reduced costs;
c. providing a valve of the above kind which can be assembled in a precise and secure manner and which better retains the bottom seal;
d. providing a valve of the above kind in which water can be directed through the valve housing without unacceptable levels of turbulence and noise; and
e. providing a valve of the above kind which can be produced in a cartridge unit and which minimizes binding of the valve disks.

These and still other objects and advantages of the invention will be apparent from the description which follows. In the detailed description below, the preferred embodiment of the invention will be described in reference to the accompanying drawings. This embodiment does not represent the full scope of the invention. Rather the invention may be employed in other embodiments. Reference should therefore be made to the claims herein for interpreting the breadth of the invention.

DESCRIPTION OF THE PREFERRED EMBODIMENT

Figure 1:
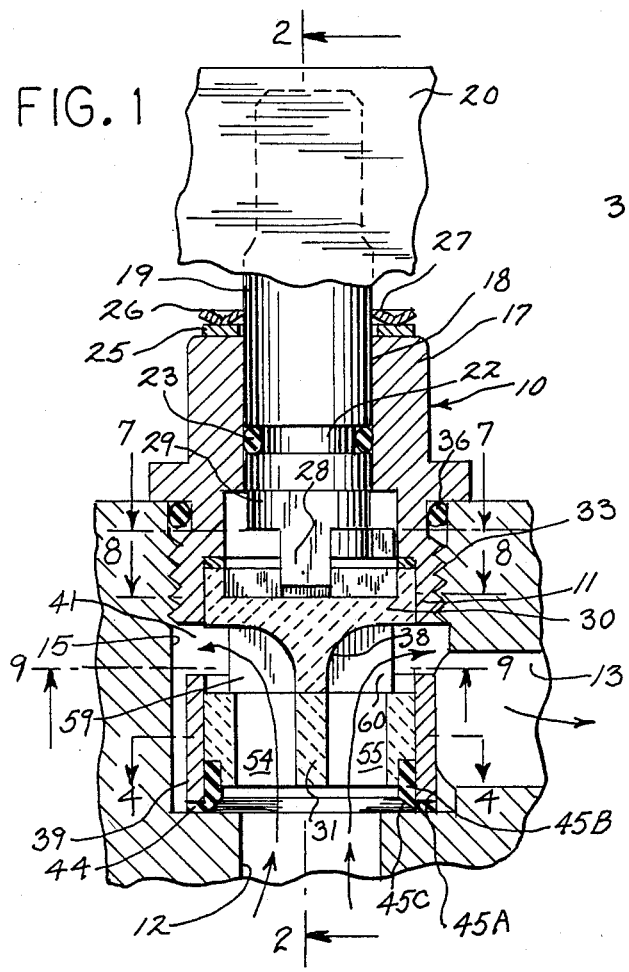
FIG. 1 is a view, partially in cross section, showing a valve assembly constituting a preferred embodiment of the invention, the assembly being mounted in a faucet housing.
Figure 2:
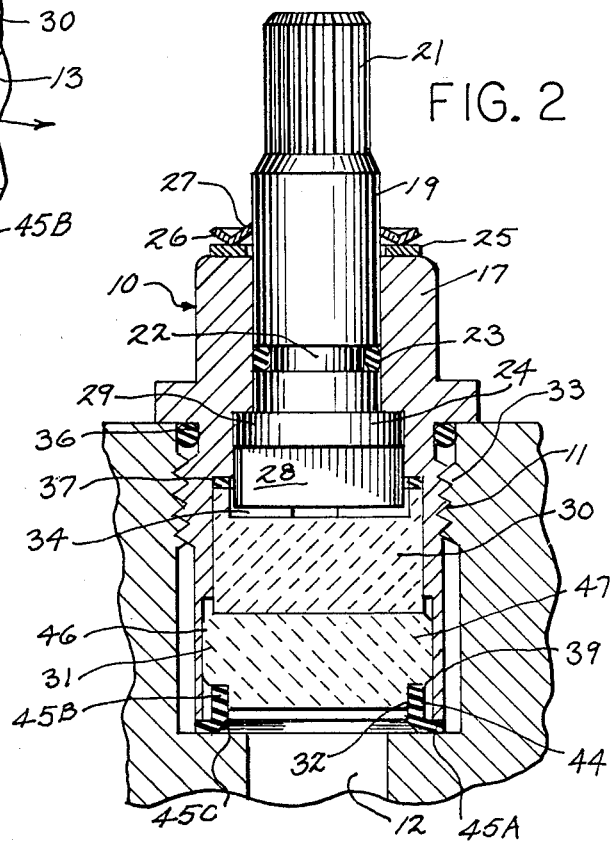
FIG. 2 is a sectional view taken along line 2—2 of FIG. 1 with the handle knob removed.
Figure 6:
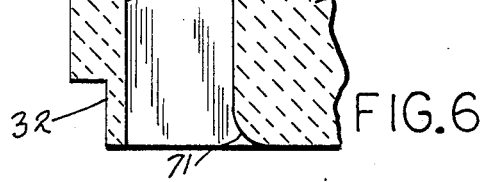
FIG. 6 is a sectional view taken along line 6—6 of FIG. 5.
Figure 3:
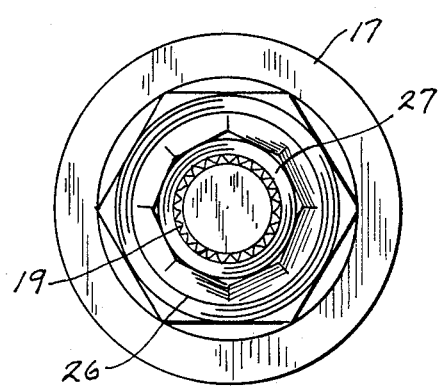
FIG. 3 is a top plan view of the valve assembly shown in FIGS. 1 and 2.
Figure 5:
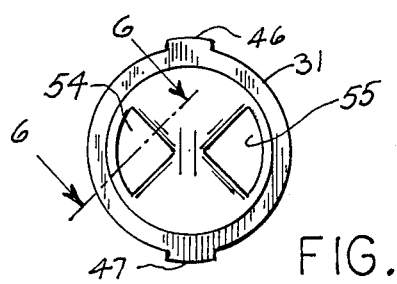
FIG. 5 is a bottom plan view of the stationary valve element.

Referring to FIGS. 1 and 2, the cartridge valve assembly generally 10 is shown in conjunction with a threaded faucet housing 11. The housing 11 has the usual bottom water inlet 12, side water outlet 13, and valve cartridge receiving cavity 15. The direction arrows in FIG. 1 illustrate the pathway of water through the cartridge valve from the inlet 12, up through the valve to side openings 41 and out into cavity 15 between the valve 10 and the faucet housing 11. The water will then be directed out of the faucet housing through the outlet 13.

A brass valve body 17 has a bore 18 for receiving a brass valve stem 19 or spindle and the usual handle knob 20 is placed on a splined upper/outer end 21. A groove 22 in the stem 19 receives an o-ring type seal 23. The stem 19 is securely held in the valve body 17 by means of a metal washer 25 and a metal grooveless type retaining member (e.g. push nut 26) which has the angled teeth portions 27 for engaging the stem 19 in a manner that the push nut can be forced onto the stem and towards the valve body 17 but cannot be easily taken off (because of the angled teeth portions 27).

Figure 11A:
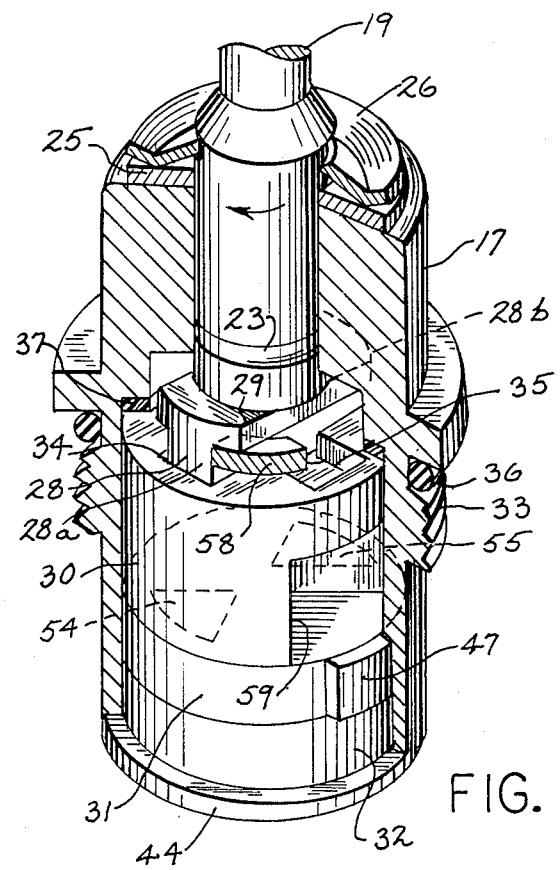
FIGS. 11A-11D are fragmented perspective views of the assembled valve cartridge illustrating right-hand and left-hand operation.

As best seen in FIG. 2, the bottom of the stem will not pass entirely through bore 18 due to the abutment of flange portion 29 engaging shoulder 24. As best seen in FIG. 11A, downward movement of the stem can be blocked both by push nut 26 and wedge shaped ledges 58 which catch under flange 29 in some (but not all) rotational positions. A bar like driving member 28 extends down from the stem and provides engagement with a movable ceramic valve element 30. This engagement is afforded by one (or the other) of the grooves 34.

Figure 4:
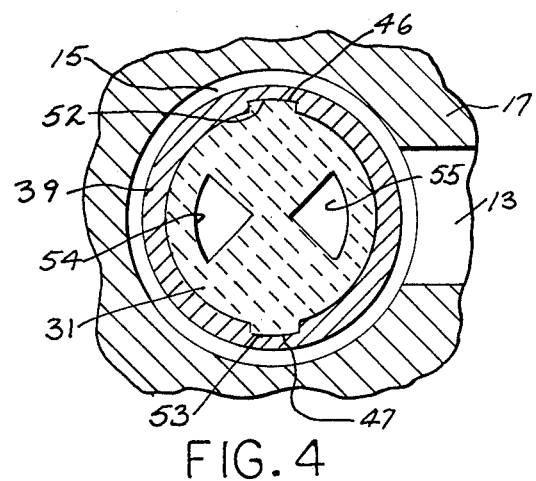
FIG. 4 is a sectional view taken along line 4—4 of FIG. 1.

The movable valve element 30 as well as the stationary ceramic valve element 31 are housed in a skirt portion 39 of valve body 17. The stationary element is held in a stationary manner by the projections 46 and 47 engaging internal slots 52 and 53 in the skirt 39 (see FIG. 4). The valve body 17 is threaded to the faucet housing 11 by the complementary threads 33. A seal 36 is positioned between the valve body 17 and the faucet housing 11.

The stationary valve element 31 has a reduced diameter portion 32 for receiving a gasket 44 which is substantially L-shaped in cross section. This gasket has a radially extending section 45A which is positioned between the end of the skirt 39 and the faucet housing 11 so as to captively hold it in this position and minimize the likelihood of ring 44 being forced back into the inlet line in the event of negative pressure. Gasket portion 45B is vertical and is sandwiched between the lower disk and the valve body. Cut-away or thinned portion 45C in the gasket reduces the axial load on the disks and reduces binding problems.

Figure 8:
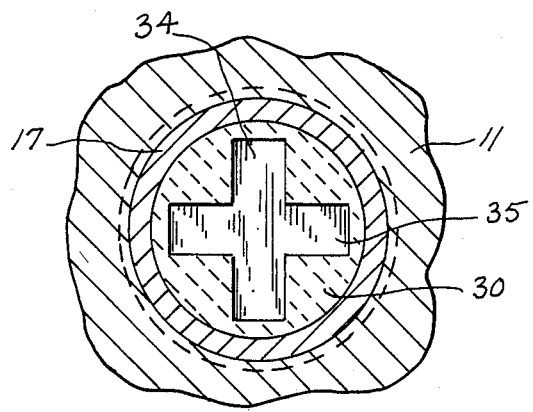
FIG. 8 is a sectional view taken along line 8—8 of FIG. 1.
Figure 9:
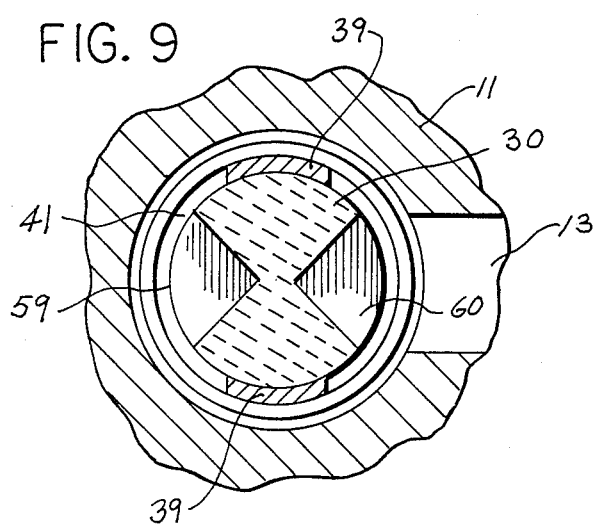
FIG. 9 is a sectional view taken along line 9—9 of FIG. 1.

As best seen in FIG. 9, the movable valve element 30 is provided with two side-by-side arc-like relief portions 59 and 60. The control of water through the valve cartridge is controlled by the orientation of these relief areas with the wedge shaped openings 54 and 55 in the stationary valve element 31. As indicated in FIGS. 1 and 8, the relief areas extend completely through the side and bottom of the movable valve element 30. This provides a pathway for the water not only from the bottom of the movable element but also laterally. Note in FIG. 1 that curved configuration surfaces 38 are provided at the top of the two relief areas 59 and 60. This surface directs the water in a smooth and continuous manner through the movable valve member and thus substantially reduces turbulence which is caused by other configurations.

Figure 11B:
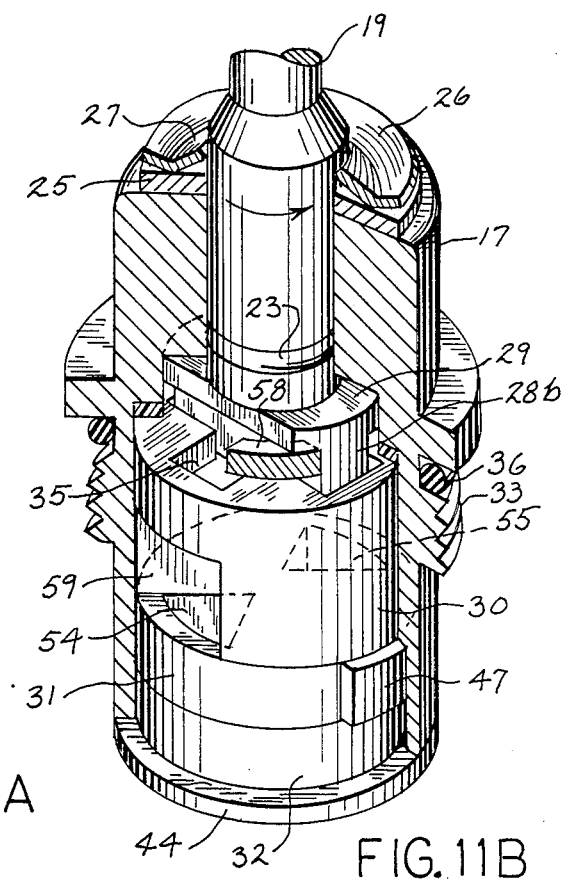
Figure 11C:
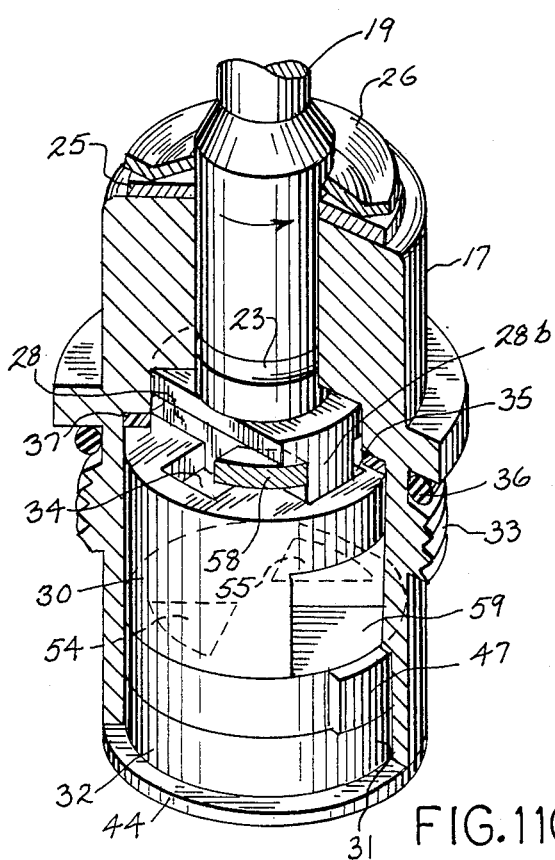
Figure 11D:
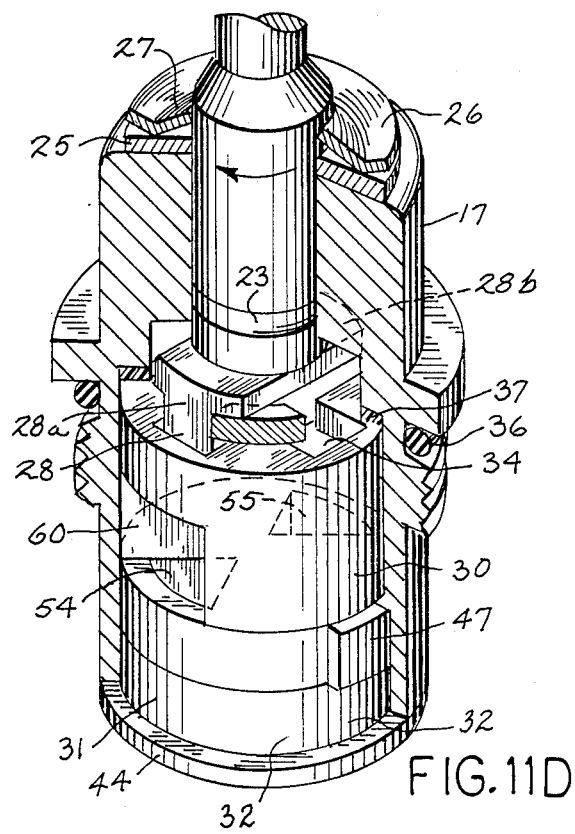

FIGS. 11A-11D illustrate that the valve cartridge can be used for both a right-hand or left-hand operation. FIGS. 11A and 11B show its usage in right-hand operation (e.g. for a cold water line) wherein a clockwise motion is employed to open and a counterclockwise motion to close. Conversely, FIGS. 11C and 11D represent its operation in a left-hand manner (e.g. for a hot water line) wherein a counterclockwise motion is employed to open and a clockwise motion to close.

Figure 7:
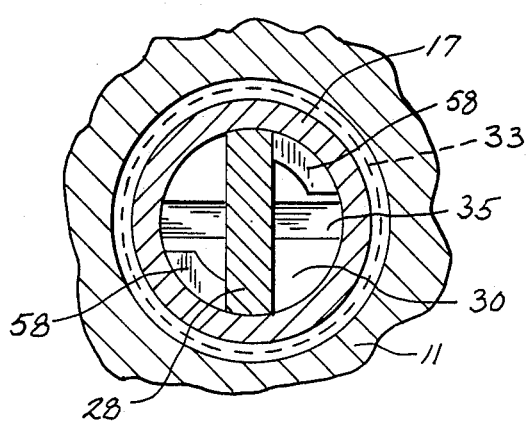
FIG. 7 is a sectional view taken along line 7—7 of FIG. 1.

Referring first to FIG. 11A, the valve cartridge is shown in a closed position with respect to fluid flow. It will be noted that the relief area 59 is positioned over a solid portion of the stationary element 31 with the inlets 54 and 55 blocked. Counterclockwise rotation is prevented by bar 28 abutting against one side of stop wedges 58. To effect an opening of the valve, the stem 19 is rotated in a clockwise manner as indicated by the directional arrow in FIG. 11A. It should be noted in this connection that bar 28 has been placed in the slot 34 of the movable valve element 30 with the ends of the projection designated for reference purposes by 28a and 28b. A 90° rotation is the most that can be effected for the stem and the projection 28 as the rotation is limited by the other side of opposing wedges 58. (See FIG. 7 for the positioning of stops 58.) The 90° rotation will move the relief area 59 over the opening 54 in the stationary valve member 31. Also, relief area 60 is aligned with inlet 55. The valve is thus in the full open position. Note that during this particular movement, the valve was moved in a *clockwise* manner to effect the opening. To close the valve, a counterclockwise motion would be imparted as indicated by the direction arrow in FIG. 11B, thereby bringing the valve back to the position shown in FIG. 11A.

Note that in FIG. 11C the projection 28 is now placed in the slot 35 rather than the slot 34. In this initial position, the valve is closed as indicated by the relief portion 59 being out of orientation with either of the openings 54 or 55. To open the valve, a counterclockwise motion must be imparted to the valve stem 19 as indicated by the direction arrow in FIG. 11C. This means that the relief area 59 will also be moved in a counterclockwise motion to be oriented over the opening 55 while the relief area 60 is brought into communication with the opening 54. Accordingly, the end portion 28b of the projection 28 will be moved to a position indicated in broken lines in FIG. 11D and the end portion 28a will be moved to that shown also in FIG. 11D. Thus, a counterclockwise motion opens the valve while a clockwise motion closes it as indicated by the directional arrow in FIG. 11D.

It will therefore be appreciated that a right hand/left hand conversion is easily achieved merely by initially aligning the bar 28 in either groove 34 or groove 35. It will also be appreciated that flange 29 assists in this process by holding the stem in place during conversion.

Figure 10:
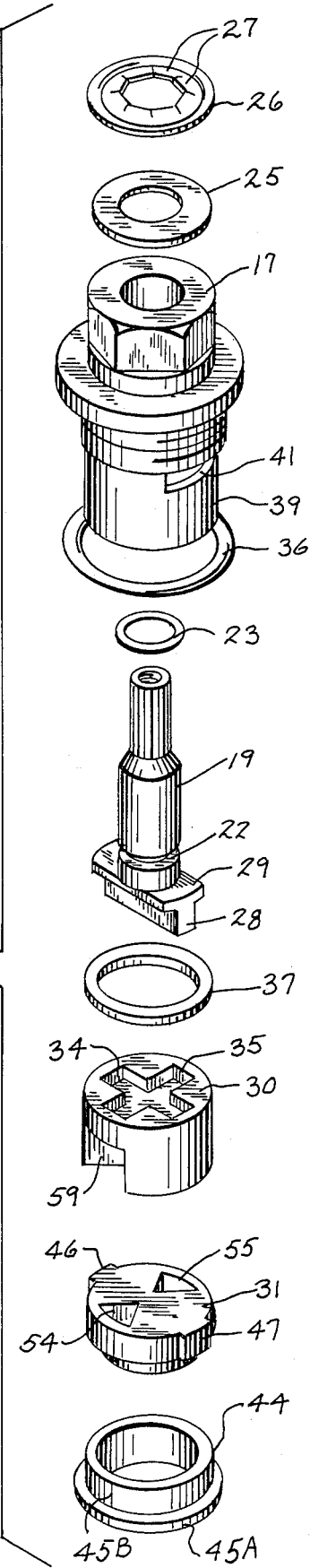
FIG. 10 is an exploded perspective view of the valve assembly parts shown in FIGS. 1 and 2.

Another important feature of this invention is the fact that the stem 19 can be easily and securely mounted in the valve body 17 without having to machine a groove in the valve stem and use the usual C-type clip. All that is required in this instance is to move the valve stem 19 upwardly into the valve body 17 as suggested in FIG. 10. This upward motion is continued until the flange 29 contacts the internal shoulder 24 (see FIG. 2). The washer 25 is then placed down over the shank portion of the valve stem 19 with the push nut 26 being forced over the outer surface thereof. As indicated earlier, the push nut 26 is designed so that it can be pushed downwardly to the desired extent but cannot be moved in the upward direction. This feature not only avoids having to machine a groove for attachment purposes but also avoids having to compensate for tolerances between the groove and the flange 29 contacting the valve body for purposes of effecting a tight engagement.

Still another feature of the valve assembly resides in the manner of the water passage through the movable valve element. This is effected by the curved wall surface 38 in the movable valve element 30. Tapered inlets in holes 54 and 55 as well as curved surface 71 further smooth out the flow and reduce noise.

Thus, the invention provides an improved valve. While the preferred embodiment has been described above, it is readily apparent to those skilled in the art that a number of modifications and changes may be made without departing from the spirit and scope of the invention. For example, while a faucet has been shown, the valve can be used with other types of fluid valves. Also, the specific materials mention are not the only materials which can be used. All such and other modifications within the spirit of the invention are meant to be in the scope of the invention.

I claim:

1. A removable cartridge type valve for use in a faucet housing or the like, the housing having an inlet in its bottom and an outlet, the cartridge type valve comprising:

a valve body having an axial bore and an open lower end for fluid communication with the inlet in the bottom of the housing and at least one outlet in the valve body for fluid communication with the outlet in the housing;

a stationary valve element and a movable valve element both positioned in the valve body for regulating fluid flow through the valve in response to rotation of the movable element over the stationary element;

a rotatable spindle sealed within an upper end of the axial bore of the valve body, the spindle having one end extending outside the valve body and the other end connected to a drive member, the spindle also having a radially extending projection positionable in the valve body;

a groove structure formed on an upper side of the movable valve element, the groove structure being capable of receiving the drive member in two positions which are more than 10° but less than 170° rotationally disposed with respect to each other; and a stop wall formed on the valve body to limit the rotation of the spindle by contact with the spindle projection;

the valve being constructed and arranged so that contact between the drive member and the movable valve element in response to rotation of the spindle rotates the movable valve element over the stationary valve element, and changing the relative positions of the groove structure and drive member between the first and second receiving positions causes a conversion of the valve from a right hand valve to a left hand valve or vice versa.

2. The valve of claim 1, wherein the groove structure is in the form of a cross.

3. The valve of claim 1, wherein a ring-like grooveless type retaining member is positioned on the spindle outside the valve body to restrict downward movement of the spindle, the ring-like member having on its inner periphery at least one tooth which projects upward at an angle relative to the plane of the outer portion of the member.

4. The valve of claim 1, wherein:
the stationary valve element is in the form of a disk, the disk having a bottom peripheral groove; and
there is also provided a gasket, one portion of which is held on the peripheral groove, and another portion of which extends radially outward under the valve body.

5. The valve of claim 1, wherein the stop is a ledge and the stop is formed in the axial bore and the stop and the spindle are constructed and arranged to restrict downward movement of the spindle in some, but not all, rotational positions of the spindle.

6. The valve of claim 1, wherein the valve body outlet is formed in a side wall of the valve body.

7. A fluid control valve, comprising:
a valve body having an axial bore, an open lower inlet end, and an outlet;
a stationary valve element and a movable valve element both positioned in the valve body for regulating fluid flow through the valve in response to rotation of the movable element over the stationary element;
a rotatable spindle sealed within an upper end of the axial bore of the valve body, the spindle having one end extending outside of the valve body and the other end connected to a drive member, the spindle also having a radially extending projection positionable in the valve body;
a groove structure formed on an upper side of the movable valve element, the groove structure being capable of receiving the drive member in two positions which are more than 10° but less than 170° rotationally disposed with respect to each other; and
a stop wall formed on the valve body to limit the rotation of the spindle by contact with the spindle projection;
the valve being constructed and arranged so that contact between the drive member and the movable valve element in response to rotation of the spindle rotates the movable valve element over the stationary valve element, and changing the relative positions of the groove structure and drive member end between the first and second receiving positions causes a conversion of the valve from a right hand valve to a left hand valve or vice versa.

8. The valve of claim 7, wherein the groove structure is in the form of a cross.

9. The valve of claim 7, wherein a ring-like grooveless type retaining member is positioned on the spindle outside the valve body to restrict downward movement of the spindle, the ring-like member having on its inner periphery at least one tooth which projects upward at an angle relative to the plane of the outer portion of the member.

10. The valve of claim 7, wherein the stop is a ledge and the stop and the spindle are constructed and arranged to also restrict downward movement of the spindle in some, but not all, rotational positions.

11. The valve of claim 7, wherein the valve body outlet is formed in a side wall of the valve body.

12. A removable cartridge type valve for use in a faucet housing or the like, the housing having an inlet in its bottom and an outlet, the cartridge type valve comprising:
a valve body having an an axial bore and an open lower end for fluid communication with the inlet in the bottom of the housing and at least one outlet in the valve body for fluid communication with the outlet in the housing;
a stationary valve element and a movable valve element both positioned in the valve body for regulating fluid flow through the valve in response to rotation of the movable element over the stationary element;
a rotatable spindle sealed within an upper end of the axial bore of the valve body, the rotatable spindle having a radially extending projection shank portion extending outside the valve body;
a drive member connected to the lower end of the spindle;
means operatively associated with the drive member and the movable valve element to provide driving contact between the drive member and the movable valve element;
a retaining member operatively positioned on the shank portion of the rotatable spindle outside the valve body to retain the rotatable spindle in the valve body; and
a stop ledge formed in the axial bore with the stop ledge and the spindle constructed and arranged to limit rotation of the spindle by contact with the spindle projection, the stop ledge also limiting downward movement of the spindle in some, but not all, rotational positions of the spindle.

13. A fluid control valve, comprising:
a valve body having an axial bore, an open lower inlet end, and an outlet;
a stationary valve element and a movable valve element both positioned in the valve body for regulating fluid flow through the valve in response to rotation of the movable element over the stationary element, the stationary valve element being in the form of a disk, the disk having a bottom peripheral groove;
a rotatable spindle sealed within an upper end of the axial bore of the valve body, the spindle having one end extending outside of the valve body and the other end connected to a drive member;
a groove structure formed on an upper side of the movable valve element, the groove structure being capable of receiving the drive member, whereby contact between the drive member and the movable valve element in response to rotation of the spindle rotates the movable valve element over the stationary valve element; and there is also provided a ring gasket having a lateral portion, the top portion of which is held between the peripheral groove and the valve body, and another portion of which extends radially outward under the valve body, said radial portion narrowing in thickness adjacent its intersection with the lateral portion.

* * * * *

UNITED STATES PATENT AND TRADEMARK OFFICE
CERTIFICATE OF CORRECTION

PATENT NO. : 4,821,765
DATED : April 18, 1989
INVENTOR(S) : Iqbal and Buccicone

It is certified that error appears in the above-identified patent and that said Letters Patent is hereby corrected as shown below:

Column 2, line 21    after "a"   --valve-- should appear

Column 6, line 61    after "outside"   --of-- should appear

Column 8, line 22    after "having"  the word "an"  appears twice, delete second occurrence Signed and Sealed this Twentieth Day of February, 1990

Attest:

JEFFREY M. SAMUELS

Attesting Officer    Acting Commissioner of Patents and Trademarks